United States Patent [19]
Fogel et al.

[11] 3,977,390
[45] Aug. 31, 1976

[54] HEATED OIL COOKING APPARATUS FOR COMESTIBLES

[75] Inventors: Joel D. Fogel; Dennis R. Headberg, both of Miami, Fla.

[73] Assignee: Burger King Corporation, Miami, Fla.

[22] Filed: Nov. 7, 1974

[21] Appl. No.: 521,792

[52] U.S. Cl. ............................ 126/374; 126/351; 99/331
[51] Int. Cl.² ........................................ A47J 27/14
[58] Field of Search ............. 99/331, 408; 219/422, 219/425; 126/374, 351

[56] References Cited
UNITED STATES PATENTS

| | | | |
|---|---|---|---|
| 3,217,633 | 11/1965 | Anetsberger | 126/390 |
| 3,495,525 | 2/1970 | Piotrowski | 99/408 |
| 3,787,594 | 1/1974 | Palmason | 99/408 |
| 3,851,640 | 12/1974 | Keating et al | 99/331 |
| 3,877,359 | 4/1975 | Keating | 99/331 |

*Primary Examiner*—John J. Camby
*Assistant Examiner*—L. I. Schwartz

[57] ABSTRACT

Cooking apparatus is provided which, in use, continuously circulates cooking oil from a cooking pot, where a removable basket for comestibles to be cooked is disposed, through a heating unit and then back to the cooking pot. The heat input of the heating unit is turned on and off by a controller which responds to the temperature that is sensed for the cooking oil to maintain the cooking oil at a predetermined temperature selectable from within a variable range of comestible cooking temperatures. The controller also has a fixed setting which overrides the selectable variable range setting of the controller and which is operable to maintain the cooking oil at a low non-cooking temperature for extended non-use periods of the cooking apparatus.

5 Claims, 6 Drawing Figures

HEATED OIL COOKING APPARATUS FOR COMESTIBLES

BACKGROUND OF THE INVENTION

The invention relates to the art of cooking and particularly apparatus for so called deep fat frying where the comestibles are immersed in a heated cooking oil to effect cooking. Such apparatus, as contemplated herein, is most suited for use in restaurants, institutions and the like where a large volume of comestibles, usually retained before cooking in a frozen condition, are deep fat fried during a relatively short period.

The prior art proposes a variety of fryers intended for large volume cooking of comestibles by deep fat frying techniques. They include equipment where the oil is withdrawn from the pot in which the comestibles are cooked, reheated and then returned to the pot in a continuous circulation procedure during the cooking process. High volume deep fat fryers of the prior art encountered difficulty in avoiding a substantial drop in cooking oil temperature and require excessive time for the oil to regain its desired cooking temperature when a substantial volume of frozen comestibles are introduced into the cooking pot. Ideally, the cooking oil temperature would not only remain at a near constant temperature throughout the cooking process but also the oil temperature should be uniform throughout all portions of the cooking pot during cooking.

It is also desirable for cooking apparatus employing heated cooking oil to have the capability of employing a variety of different cooking oils including those that are in a liquid state at normal room temperature and those that are in a solid state at such normal room temperature. Many of the prior art proposals do not have this capability, particularly those wherein rapid temperature recovery and substantially constant temperature control during the cooking process is maintained by withdrawing the oil from the cooking pot to a rapid input heating unit and then returning it to the cooking pot. Where a solid cooking oil at normal room temperature is employed, the cool down of the oil during non-use of the cooking apparatus involves hardening of the oil throughout the normal cooking oil circulating circuit making start up of the cooking apparatus extremely difficult with this hardened solid cooking oil in the circuit.

It is a principal object of this invention to provide apparatus for deep fat frying comestibles wherein rapid recovery and temperature maintenance of the cooking oil temperature is achieved with a dual capability temperature control, one enabling maintenance of the temperature at the desired adjustable cooking level selected within a variable temperature range and the other providing a fixed standby low temperature which is above normal room temperature and thus maintains the cooking oil at a minimal temperature during extended non-use periods of the cooking apparatus.

A further important object of the invention is to provide cooking apparatus wherein a cooking oil that is normally solid at room temperature can be maintained in a cooking oil circulating type deep fat fryer at a minimal temperature during non-use of the apparatus, such as during an overnight closed down period of the restaurant or institution in which the cooking apparatus is employed.

A further significant object of the instant invention is to provide deep fat frying apparatus wherein a thermistor probe is employed to sense and control the temperature of the cooking oil being withdrawn from the cooking pot to a rapid recovery heating unit and then returned to the pot in a continuous circulation procedure, the thermistor probe being connected with a control unit which has a dual control capability, one to turn the heating source on and off to maintain the desired high cooking temperature within a variable range for temperature selection, and the other to override the variable temperature range control and maintain a relatively low temperature level so that the cooking oil is kept in a liquid state if it be a normally solid cooking oil at room temperature or keep the cooking oil, be it liquid or solid, at a reasonably low start up temperature to expedite start up of the cooking apparatus after an extended shutdown or standby period.

Other objects and advantages of this invention will become apparent from the following description of specific embodiments of the invention taken in connection with the accompanying drawings, the embodiments of this invention being set forth solely by way of illustration and example.

DETAILED DESCRIPTION OF THE INVENTION

Figure 1:
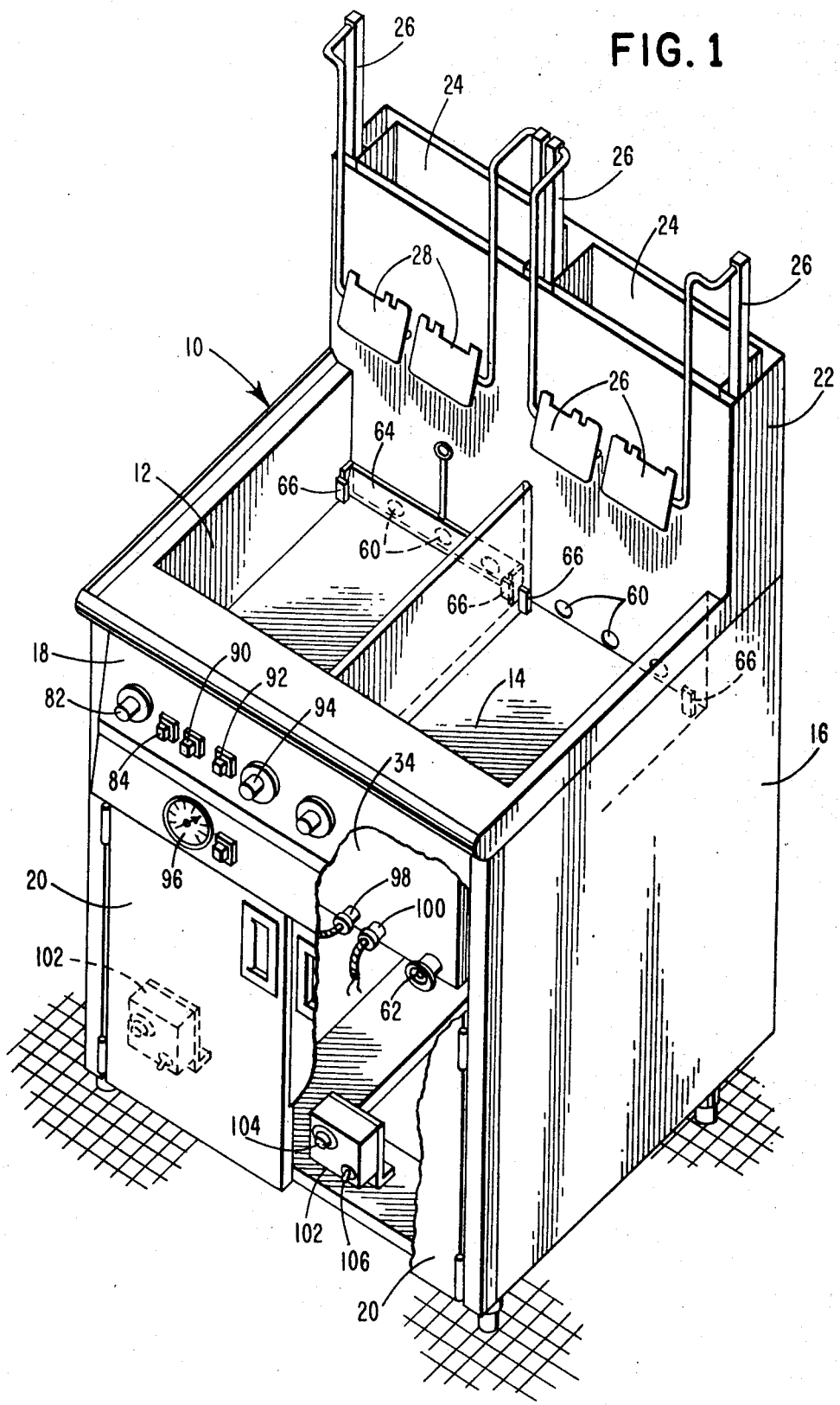
FIG. 1 is a perspective view of the comestible cooking apparatus of this invention with a portion of the front control panel and front closure doors shown broken away.

Referring to the drawings, FIG. 1 illustrates, in perspective, a complete cooking apparatus 10 wherein comestibles are immersed in heated cooking oil by their being placed in removable baskets (FIG. 2) which are separately lowered in the cooking pot to effect cooking. The embodiment, as illustrated in FIG. 1, has a pair of cooking pots 12 and 14 which are disposed side by side and supported in a cabinet 16. The front wall of cabinet 16 is formed by a control panel 18 extending across the forward ends of the cooking pots 12 and 14 and a pair of closure doors 20 which are hinged respectively to the opposite sidewalls of cabinet 16 and may be opened to give access to the operating components, wiring, etc. housed within the cabinet beneath the pair of cooking pots.

Figure 2:
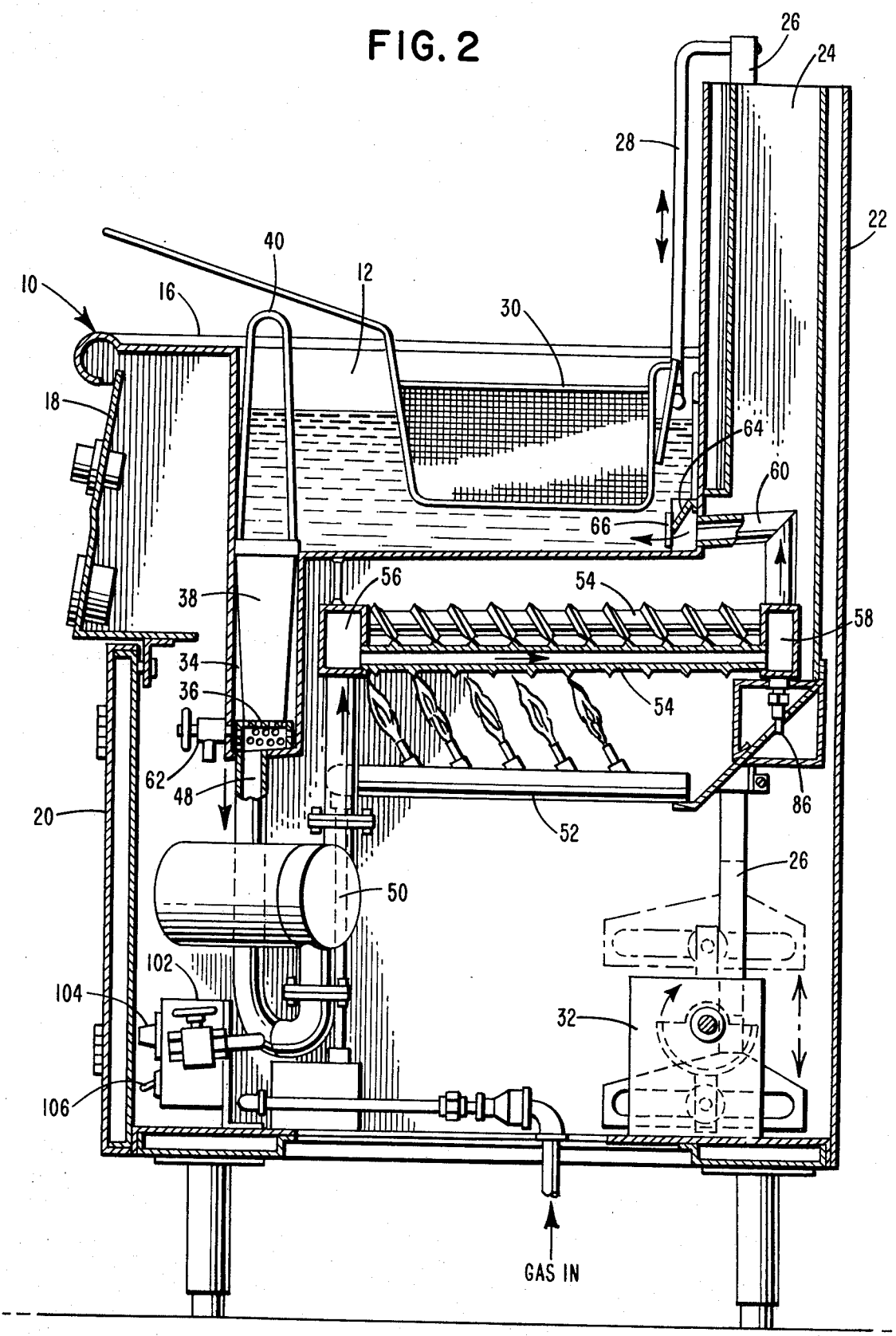
FIG. 2 is a front-to-back vertical sectional view of the apparatus of FIG. 1.

Extending upwardly from cabinet 16 at the rear of the pair of cooking pots is a housing 22. In the gas heated version of the cooking apparatus shown in FIGS. 2 and 3, housing 22 will enclose a pair of flues 24, one for each of the heating units associated and disposed beneath each of the two cooking pots 12 and 14. Housing 22 in both the gas or electrically heated versions of the cooking apparatus encloses the four parallel lift arms 26 to handle the separate lowering and raising of four cooking baskets 30. Each lift arm carries a hanger 28, the hangers being engaged by hooks provided at the rear of a basket 30 to cooperate as shown in FIG. 2. Each lift arm 26 extends down to a motor driven raising and lowering mechanism identified as 32 (FIGS. 2 and 3).

Each hanger 28 is notched to receive the hooks on the rear of an individual basket 30 and, accordingly as shown, each cooking pot 12 and 14 will accommodate two baskets 30. Likewise each hanger 28 is raised and lowered by the individual lift arm 26 which supports it. The raising and lowering mechanism 32 incorporates individual motor means for each lift arm 26 so that each motor means may be controlled, in the manner to be described, to raise and lower its hanger 28 in raising and lowering the basket 30 carried on such hanger. This raising out of and lowering into the heated cooking oil is automatically carried out in a timed cycle as will be described in connection with the control circuitry.

Figure 3:
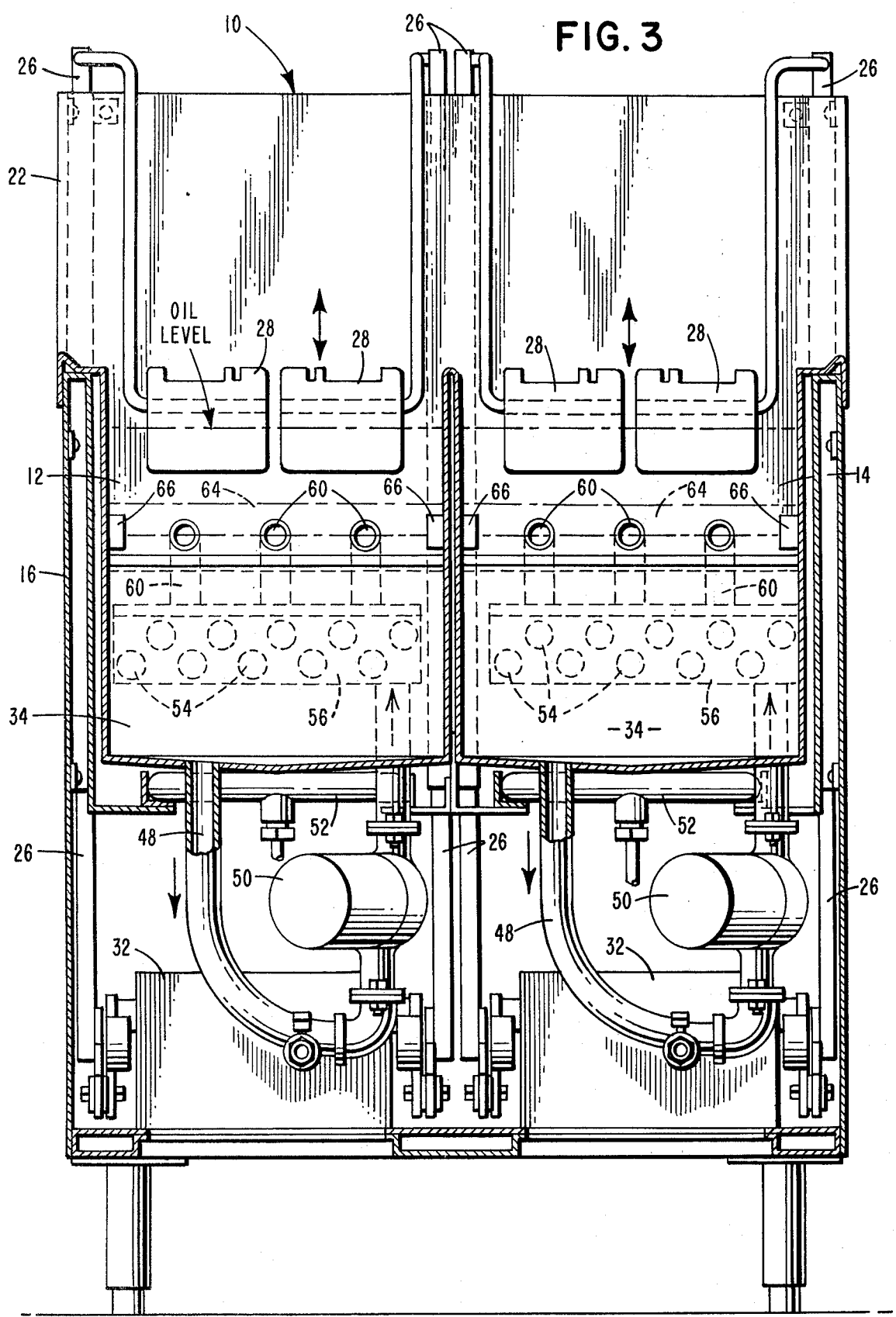
FIG. 3 is a transverse vertical sectional view of the apparatus shown in FIG. 1.
Figure 4:
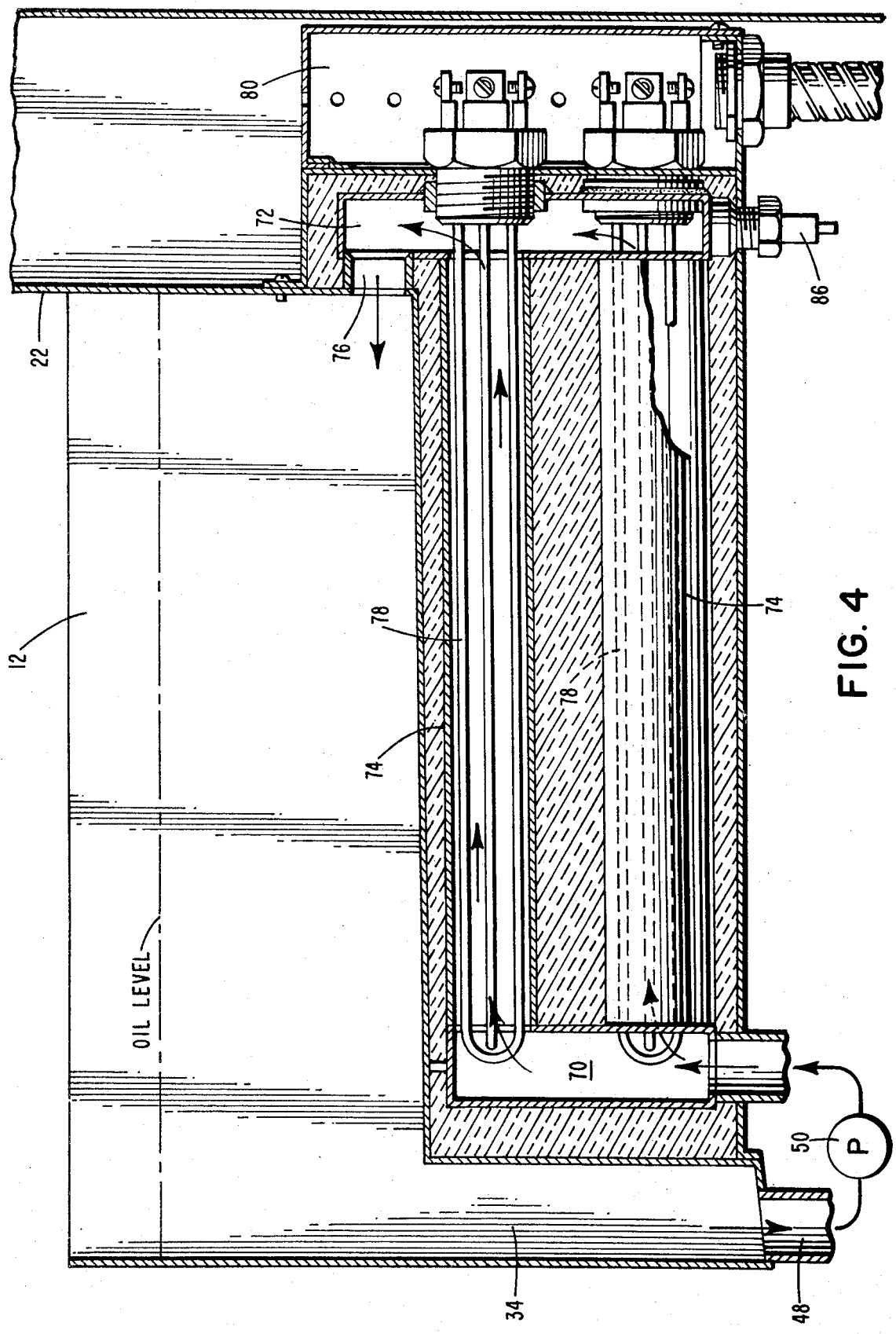
FIG. 4 is a sectional view of the heating unit mounted below the cooking pot employing an electric heating source.
Figure 5:
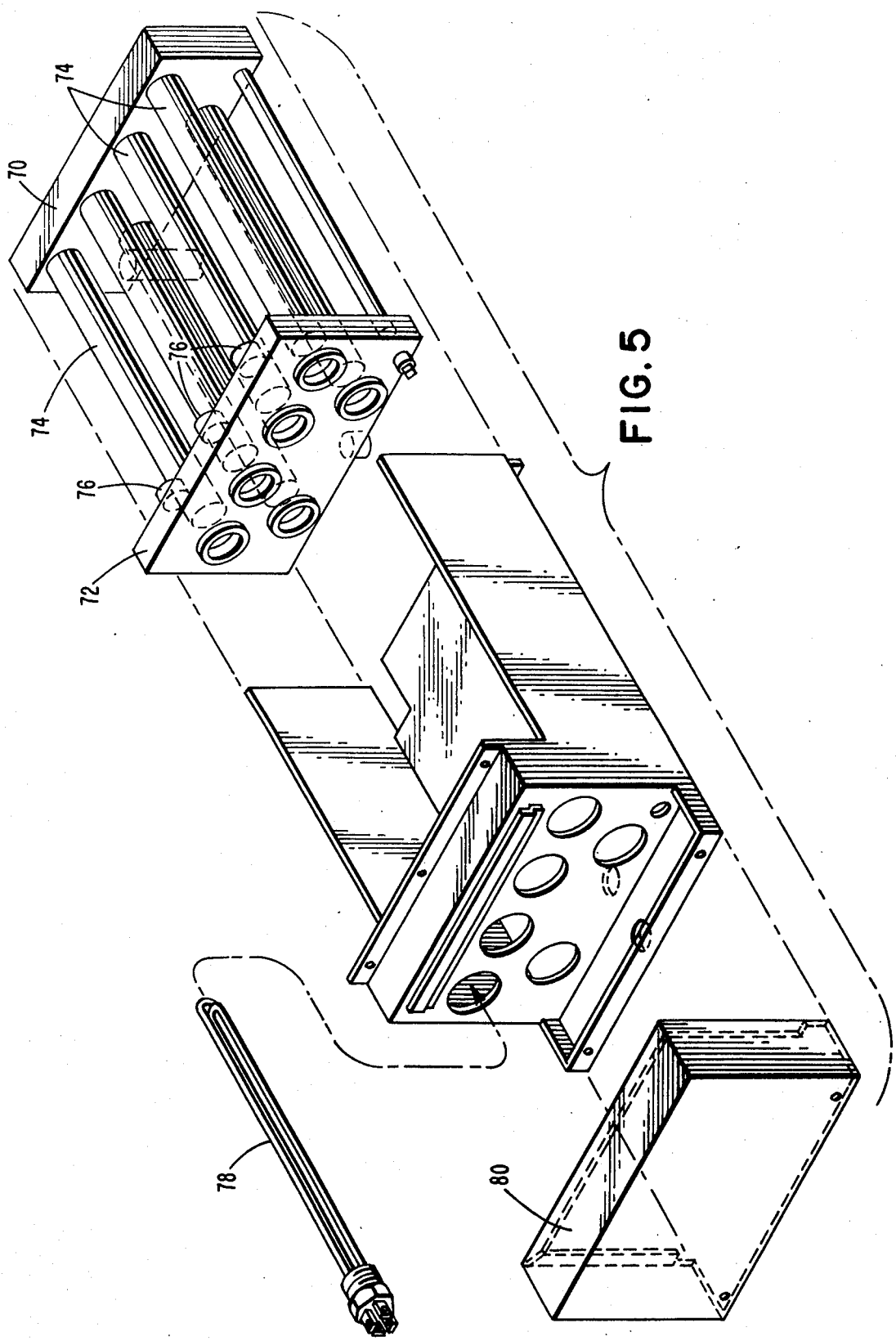
FIG. 5 is an exploded view showing the components making up the heating unit shown in FIG. 4.

The basic construction internally of cabinet 16 is best seen in FIGS. 2 and 3, both of which illustrate a gas heated version of the cooking apparatus 10. FIGS. 4 and 5 illustrate a heating unit employing an electrically heated unit for the circulating cooking oil heating operation.

Figure 6:
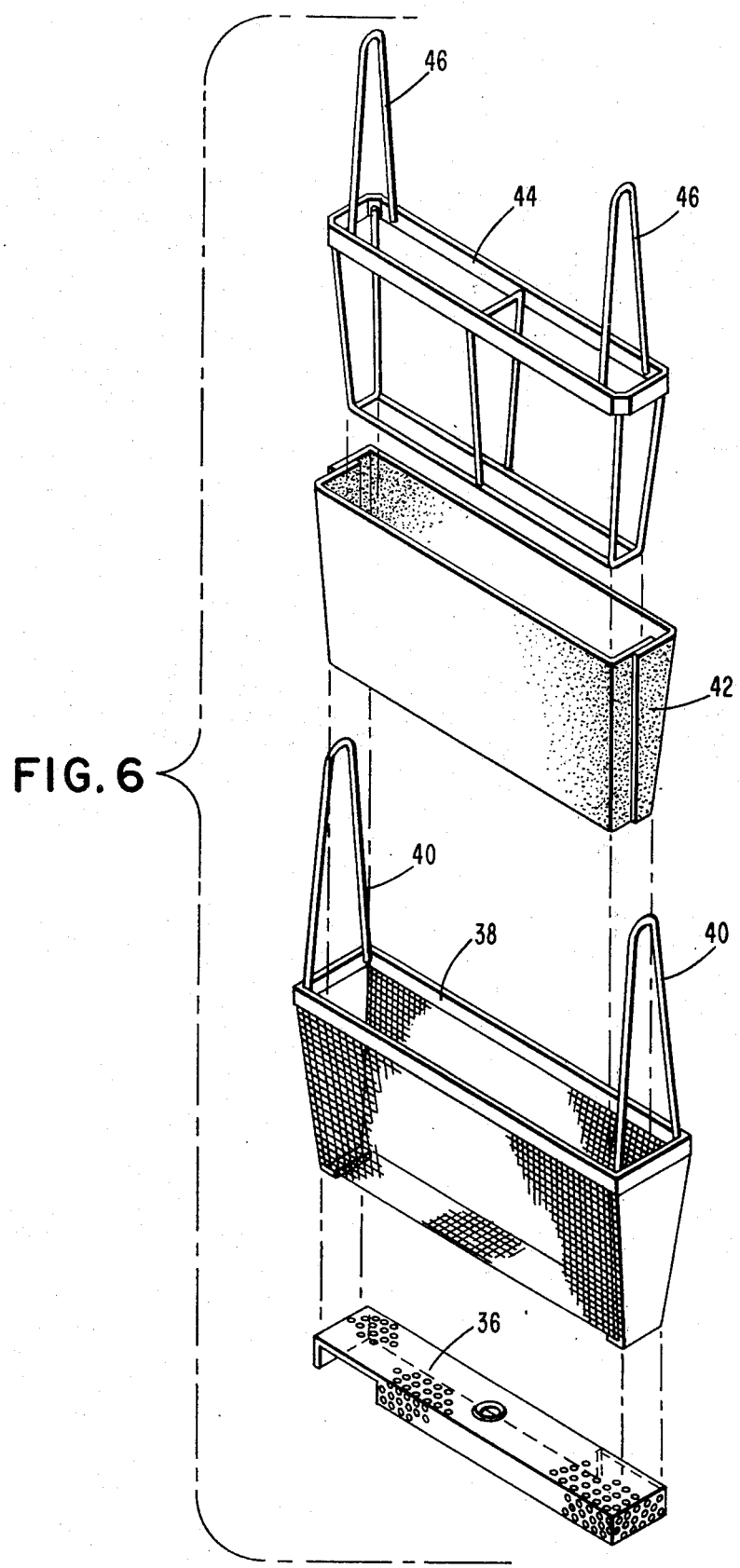
FIG. 6 is an exploded view showing the components making up the filter assembly employed in the filter chamber through which the cooking oil is drawn to be circulated to the heating unit.

FIG. 2 shows cooking pot 12 in section. The pot has a filter chamber 34 open at its upper end to communicate with the cooking oil outlet in the forward portion of the bottom wall of pot 12. Of course, pot 14 is similarly constructed. The filter assembly for insertion into this filter chamber is shown in FIG. 6.

In the bottom of the filter chamber, a base plate 36, constructed of perforated sheet metal, provides a raised shelf to support the filter basket 38 within the chamber. The basket has upwardly extending handles 40, which may conveniently be engaged in raising and lowering the filter basket relative to the filter chamber 34 in cleaning the filter assembly and replacing the filter liner. A filter liner 42 fits down within basket 38, the cooking oil being withdrawn from the cooking pot for circulation through the heating unit and back to the cooking pot flows through this filter liner for removal of any burned or carbonized particles and other undesirable content within the oil which may have accumulated therein incident cooking operations. The filter assembly is completed by a frame 44 which acts to hold the filter liner 42 securely within the basket 38. Like basket 38, the holder 44 has a pair of upstanding handles 46 to facilitate its removal from the basket and enable the filter liner 42 to be removed and replaced with a new liner.

Referring to FIGS. 2 and 3, the cooking oil leaving the outlet of cooking pot 12 is withdrawn from the bottom of the filter chamber 34 through pipe 48 by motor driven pump 50. The pump then directs the cooking oil to the heating unit which in the embodiments of FIGS. 1, 2 and 3 utilizes a gas energy source provided by burner 52 which directs its heat output against spaced parallel tubes 54 that extend between an inlet header 56 and an outlet header 58. This heating unit is disposed immediately below the bottom of the cooking pot 12 so that heat is not only transferred to the cooking oil circulated through tubes 54 but also over the bottom of the cooking pot. Thereafter the products of combustion pass up the flue 24 in housing 22. The oil, now reheated after flowing through the heating unit leaves header 58 through three spaced angled pipes 60 which communicate at spaced locations along the rear wall of the cooking pot near the bottom thereof with the cooking pot interior.

It may be noted that the flow of the oil into, through and out of the cooking pot and filter chamber, promotes drainage of oil from the system when it is to be replaced. Thus, the oil inlets from the angled pipes 60, the bottom of the cooking pot and the bottom of the filter chamber are inclined toward the forward end of the cooking apparatus to encourage drainage of the oil from the drain 62 located at the forward bottom portion of the filter chamber 34.

It will also be noted that a removable cooking oil deflector 64, as shown located in cooking pot 12 on FIG. 1 and 2, may be placed along the back wall of the cooking pot held in place by ribs 66 fixed to the opposite sidewalls of the cooking pot. The deflector is disposed so that the freshly heated cooking oil entering through the three pipes 60 will be restrained from flowing upwardly into the pot to cause undesired oil turbulence or disturbence of comestibles disposed in a basket 30 immersed in the cooking oil in the pot.

FIGS. 4 and 5 illustrate an embodiment utilizing an electric energy source in the heating unit which is supplied by cooking oil withdrawn from the cooking pot by the pump 50. It may be used in the cooking apparatus 10 in place of a gas heating unit where the use of an electric energy source is desired. The electrical heating unit is disposed immediately beneath the cooking pot bottom as in the case of the gas energized heating unit heretofore described. Its positioning beneath the cooking pot bottom is shown in FIG. 4, while FIG. 5 shows an exploded assembly of the components which together make up the heating unit.

Cooking oil withdrawn from the cooking pot through filter chamber 34 by pump 50 is supplied to the electrically energized heating unit. This unit has an inlet header 70 connected to an outlet header 72 by a series of parallel tubes 74. Header 72 extends upwardly to lie behind the lower portion of the rear wall of the cooking pot and is in communication with the cooking pot interior by means of three spaced nipples 76.

The electric energy input to the oil flowing through the tubes 74 of the heating unit is supplied by heating elements 78 which are secured in fluid type relation to and extending through the back wall of the header 72. These heating elements are positioned so that an individual element 78 extends centrally within each tube 74. Electric connections to the respective heater elements 78 are provided rearwardly of header 74 in a connection box 80.

In considering the operating controls and temperature regulation employed for the cooking apparatus 10, reference to these controls and operation for one of the two cooking pots 12 and 14 will be given, it being understood that the controls and operation for the other cooking pot are identical. Thus, one or both of the cooking pots may be employed and, indeed, one or both of the baskets 30 within a cooking may be utilized within any one cooking pot depending upon the demand needs for cooked comestibles at the time of use of the apparatus. Furthermore, it will be readily appreciated that if desired, the cooking apparatus may be constructed with only one cooking pot and, if the power driven raising and lowering for the baskets 30 is not desired, its parts may be omitted and the baskets simply manually lowered into and raised out of the heated cooking oil.

Referring again to FIG. 1 and the controls provided on the control panel 18, each cooking pot 12 and 14 has its own grouping of controls disposed on such panel in the area immediately in front of the particular cooking pot. The controls for pot 12, reading from left to right on FIG. 1, consist first of a rotatable dial timer 82. This may be a timer having a five minute timing capability, for example. By manipulating the timer to set it to the time desired for the cooking cycle, the raising and lowering mechanism 32 for the left basket 30 in the cooking pot 12 will be energized. The mechanism then automatically lowers the left basket into the heated cooking oil, retains it therein for the time setting dialed into the timer 82 and, when this time cycle has expired, the timer re-energizes the lowering and raising mechanism to raise the left basket out of the heated cooking oil in pot 12 in which it had been immersed. The next control item applicable to cooking pot 12 on panel 18 is the high limit indicator light 84 which only becomes illuminated when the high temperature thermoswitch 86, located at the bottom of the rear header 58 in the gas heated version of the heating unit or at the bottom of the rear header 72 in the electrically heated heater unit, detects a high limit temperature for the heated cooking oil, in the order of 390°F.

At the center of the cluster of controls for the cooking pot 12, there is located the main power on and off switch 90. When this switch is actuated, it connects power in the cooking apparatus 10 for operation of the various components applicable to cooking pot 12 including the cooking oil circulating pump 50 and the gas valve to ignite and supply gas to the gas burner 52 or to energize electric heating elements 78 in the electrically energized heating unit. Switch 90 preferably also illuminates a built in pilot light so that the illuminated switch button advises that main power is on for the particular cooking pot being employed.

To the right of main power switch 90, a light 92 is provided which cycles on and off in accordance with the heating unit being on or off in conjunction with maintaining the cooking oil temperature at the desired cooking range. Finally, rotatable dial timer 94 completes the group on the upper portion of panel 18 for cooking pot 12, this timer operating, similarly to the timer 82, but functioning to control raising and lowering, and timed cooking with respect to the right basket associated with cooking pot 12.

Below the above-described grouping of controls for cooking pot 12, a temperature indicating dial 96 is provided. This temperature indicator reflects the temperature of the cooking oil leaving the filter chamber 34 of pot 12. Its temperature reading is obtained from a temperature sensing probe 98 which extends through the front wall near the bottom of the filter chamber 34 and transmits a reading to the dial thermometer 96 on panel 18. This reflects the temperature of the oil at the point where it is leaving the filter chamber 34 of filter pot 12 to be circulated by pump 50 into the gas or electrically energized heating unit and then be returned to the cooking pot.

The hereinabove described comestible cooking apparatus by deep fat frying techniques incorporates particular capabilities for control and operation which are advantages in day-to-day operation of the apparatus both during high volume cooking requirements and during extended non-use or shutdown periods, such as may occur during overnight intervals where the establishment in which the cooking apparatus is employed is closed. The controls hereinafter described, not only give the desired on/off application of heat energy in the form of gas or electricity to maintain a desired selected cooking oil temperature from the range of cooking temperatures on the control and achieve rapid oil heat recovery, but also provide the ability to immediately change to a standby condition where the cooking oil will be retained at a low temperature, insufficient to perform effective cooking of comestibles but high enough to prevent a solid type cooking oil from solidifying. This low temperature also offers a safe temperature should accidental human exposure to the cooking oil occur during a shutdown and enables more rapid start up of the cooking apparatus when the establishment reopens for cooking operations.

A portion of front panel 18 and of one of the doors 20 closing the front of cabinet 16 of cooking apparatus 10 is broken away on FIG. 1 to show the location of thermometer probe 98 and thermistor probe 100 relative to the bottom of one filter chamber 14 and cooking oil withdrawal pipe 48. To simplify illustration and avoid confusion in illustration, the connecting cables, conduits, etc. between the controls and electrically energized components are not illustrated on the drawings.

A thermistor probe 100 is mounted in the front wall of the filter chamber 34 adjacent the bottom of the chamber and immediately adjacent to the thermometer probe 98. The thermistor probe 100 projects into the cooking oil flowing down through the filter chamber to be circulated to the heating unit for the heat addition thereto. It responds rapidly and effectively to changes in cooking oil temperatures at this critical location by changing its electrical resistance with changes in oil temperature. Using these electrical resistance changes, the heating unit is cycled on and off in accordance with the temperature input needed to maintain constant temperature of the cooking oil in the cooking pot. The thermistor probe 100 is connected to a thermistor control 102.

The thermistor control 102, which is mounted behind the closure doors 20 of cabinet 16 so as to be out of reach for individual operators of the cooking apparatus, carries a cooking temperature selecting dial 104 which is turned over the variable range of the dial settings to set the desired cooking temperature for the cooking oil. The thermistor control preferably provides an adjustable range, through manual setting of dial 104, between about 290°F and 365°F. Thermistor probe 100 is connected to this control and responds through its sensing of the cooking oil temperature at the bottom of the filter chamber through the thermistor control to turn the heating unit on or off in maintaining the desired constant temperature.

The thermistor control also carries, adjacent dial 104 for the variable range control of oil temperature needed for cooking, a toggle switch 106 which may be shifted between two actuated positions. These positions may be denoted as an "off" position where the cooking temperature dial setting of 104 responds to the thermistor probe temperature sensed for the cooking oil and turns the heating unit on or off in accordance with the cooking temperature set on the dial 104 of the thermistor control 102. The other position of toggle switch 106 may be denoted a "standby" position. When the switch is shifted to this standby position, the variable range setting control capable through the setting of dial 104 in control 102 is overridden and the control 102 operates the heating unit on and off only as necessary to maintain a low standby temperature, in the order of 125°F. When shifted to this standby position by actuating toggle switch 106, the cooking oil will be permitted to cool down to the low standby temperature to maintain it in a liquid state, if it be normally a solid cooking oil at room temperature. This leaves the oil at a safe temperature against human contact and at more ready start up temperature after an overnight shutdown of the cooking apparatus.

It may be mentioned that the functioning of a thermistor in responding to temperature changes in a liquid is well known and its description need not be set forth herein. In essence, the thermistor changes its resistance in response to temperature changes. As this resistance is connected into the control 102, the resistance forms one leg of an electrical Wheatstone bridge. When the bridge is unbalanced, as by a low thermistor resistance, the imbalance is amplified and used through a trigger circuit, such as a SCR, which acts to energize a relay which in turn makes the circuit for the on condition of the heating unit. The off condition of the heating unit follows from a high thermistor resistance.

An appropriate thermistor sensing temperature controller for use as 102 in the instant invention is available from Fenwal, Inc. of Ashland, Mass. in the form of such company's Series 194 controller. An appropriate thermistor probe, compatible with this Series 194 controller, to serve as probe 100, is also available from Fenwal, Inc. Whereas the components available from Fenwal, Inc. are identified herein as suitable for the controls in the cooking apparatus 10, it is to be understood that other and suitable equivalent components may be employed in the invention to achieve the desired results attributed to this invention.

Since the cooking apparatus is intended for use in cooking products for human consumption, it is preferable that the cabinet, cooking pot, heating unit and all piping and connections be constructed of stainless steel for sanitary and practical reasons. However, it is to be understood that the apparatus of this invention is not to be limited to the particular construction of the preferred embodiments described and illustrated herein but that various changes and modifications may be made therein without departing from the spirit and scope of the invention, as defined in the appended claims.

We claim:

1. Apparatus for cooking comestibles immersed in a heated cooking oil comprising:
   an upwardly opening cooking pot having a cooking oil inlet and an outlet,
   an oil circulating pipe connected between said outlet and said cooking oil inlet to the pot, said pipe having pump means and a heating unit disposed along its length to circulate cooking oil from said outlet through a filter chamber disposed between said outlet and said oil circulating pipe to said inlet and to heat the circulating cooking oil,
   a temperature sensing probe mounted to sense the cooking oil temperature,
   a temperature controller,
      means connecting said temperature controller to said probe and said heating unit, said temperature controller comprising means to cycle the heat input of said heating unit on and off in response to the temperature sensed by said probe, and means to choose a predetermined temperature at which to maintain said oil,
      said means to choose comprising variable range setting means during cooking and means to maintain a fixed, low, non-cooking, temperature setting which overrides said variable range setting means, said means to maintain said low temperature being connected to said means to cycle said heating unit on and off.

2. Apparatus for cooking comestibles as recited in claim 1 wherein said outlet is disposed in the bottom of said cooking pot, said filter chamber to accommodate a filter therein is mounted below and communicates with said pot through said bottom outlet, said oil circulating pipe is connected between the lower end of said filter chamber and said cooking oil inlet to the pot, and said probe is mounted at the lower end of said filter chamber.

3. Apparatus for cooking comestibles as recited in claim 1 wherein said temperature sensing probe is a thermistor and said temperature controller is responsive to resistance changes in the thermistor caused by temperature changes in the cooking oil.

4. Apparatus for cooking comestibles as recited in claim 1 wherein said probe is mounted to sense the temperature of the cooking oil adjacent the outlet from said cooking pot, and a high temperature cut-off is mounted to sense the cooking oil temperature adjacent said cooking oil inlet and cut-off said heating unit at a high limit temperature.

5. Apparatus for cooking comestibles as recited in claim 1 wherein said variable range setting on said controller is provided by an adjustable dial for selecting the desired cooking temperature for the oil within a range of comestible cooking temperatures, and said fixed setting on said controller is provided by a switch which is actuatable to control said heating unit so as to maintain a low non-cooking temperature.

* * * * *